United States Patent [19]

Seibert et al.

[11] Patent Number: 4,890,003

[45] Date of Patent: Dec. 26, 1989

[54] CAPACITIVELY BUFFERED POWER SUPPLY FOR AN ELECTRONIC DEVICE

[75] Inventors: Rudolf Seibert, Kirchheim-Heimstetten; Claus Cramer, Nuremberg, both of Fed. Rep. of Germany

[73] Assignee: Siemensaktiengesellschaft, Berlin and Munich, Fed. Rep. of Germany

[21] Appl. No.: 268,485

[22] Filed: Nov. 8, 1988

[30] Foreign Application Priority Data

Nov. 10, 1987 [DE] Fed. Rep. of Germany ....... 3738183

[51] Int. Cl.$^4$ ............................................. H02J 9/00
[52] U.S. Cl. ....................................... 307/66; 323/266
[58] Field of Search ............... 323/266, 270, 273, 275, 323/303; 307/66, 75

[56] References Cited

U.S. PATENT DOCUMENTS

| 3,373,344 | 3/1968 | Seer | 323/266 |
| 3,786,339 | 1/1974 | Milovancevic | 323/266 |
| 4,560,887 | 12/1985 | Schneider | 307/66 |
| 4,712,171 | 12/1987 | Yamashita | 323/303 |
| 4,754,388 | 6/1988 | Pospisil | 323/266 |
| 4,795,914 | 1/1989 | Higa et al. | 307/64 |

FOREIGN PATENT DOCUMENTS 465627 6/1975 U.S.S.R. ............................... 323/266

Primary Examiner—Patrick R. Salce
Assistant Examiner—Jeffrey Sterrett
Attorney, Agent, or Firm—Kenyon & Kenyon

[57] ABSTRACT

According to the invention, a buffer capacitor (4) is connected, on the one hand, via a series controller (5) limiting the charging voltage of the buffer capacitor (4), to supply voltage terminals (2, 3) and, on the other hand, via a voltage stabilizing circuit (6), to lead terminals (1a, 1b) of the electronic device (1). Thus the buffer capacitor (4) can be charged to a charging voltage which is clearly above the operating voltage of the electronic device (1), so that the period until the minimum operating voltage of the electronic device (1) is reduced, is lengthened. In addition, a constant operating voltage is available for the electronic device (1).

4 Claims, 1 Drawing Sheet

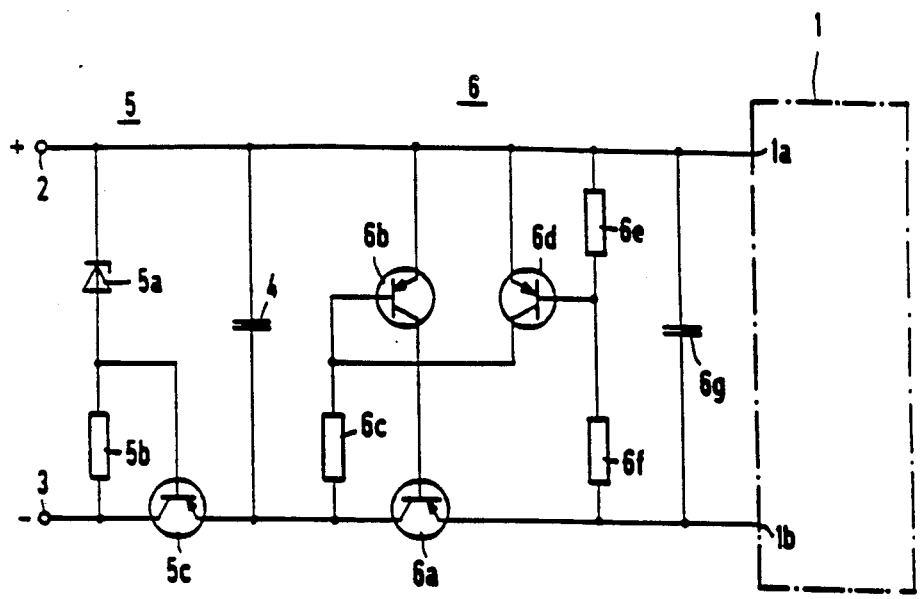

CAPACITIVELY BUFFERED POWER SUPPLY FOR AN ELECTRONIC DEVICE

BACKGROUND OF THE INVENTION a. Field of Invention

The invention relates to a power supply unit for an electronic device with capacitor buffering, a buffer capacitor being inserted between the supply voltage terminals and the lead terminals for voltage supply to the electronic device.

b. Description of the Prior Art

In power supply units for electronic devices care is often taken that in case of brief power failure the voltage supply for the electronic device will not immediately be interrupted. This is especially important e.g. in electronic timepieces or devices provided with volatile memories, because they lose their data content even after a brief failure of the supply voltage.

A common method for bridging brief power failures is to use a buffer capacitor, which is able for a short time to take over the current supply for the electronic device. In conventional devices the buffer capacitor is charged only to the operating voltage of the device. As the buffer capacitor discharges through the device, it soon reaches its minimum operating voltage, depending on the size of the buffer capacitor and current consumption of the electronic device. This then leads to failure of the electronic device. It is therefore necessary to use buffer capacitors of relatively high capacity to bridge a prolonged voltage failure. Such buffer capacitors are not only expensive, but they also require much space. Furthermore, many electronic devices function only in narrow voltage ranges, so that a decrease in operating voltage during the discharge of the buffer capacitor causes considerable disturbance.

OBJECTIVES AND SUMMARY OF THE INVENTION

It is, therefore, the object of the invention to construct a power supply unit in such a way that, after failure of the supply voltage, the operating voltage remains constant at least for a reflected duration, and that at a given current consumption of the electronic device, the buffer capacitor can be made smaller.

According to the invention this problem is solved in that the buffer capacitor is connected, on the one hand, via a series controller limiting the charging voltage of the buffer capacitor, to the supply voltage terminals and, on the other hand, via a voltage stabilizing circuit, to the terminals of the electronic device.

By the arrangement described above, during discharge of the buffer capacitor, the supply voltage to the electronic device remains constant. In addition, the buffer capacitor can be charged to a voltage clearly above the operating voltage of the electronic device, so that the time period in which the capacitor voltage falls below the minimum operating voltage of the electronic device, i.e. the time period in which the buffer capacitor can take over the voltage supply to the electronic device, is lengthened.

BRIEF DESCRIPTION OF THE FIGURE

An embodiment of the invention is explained more specifically below with reference to the FIGURE.

DETAILED DESCRIPTION OF THE INVENTION

An electronic device 1 is supplied with voltage from a network via supply voltage terminals 2, 3. A buffer capacitor 4 is provided for bridging brief voltage failures. The latter is connected on the one hand directly to the supply voltage terminal 2 and on the other hand, via the collector-emitter path of a transistor 5c, to the supply voltage terminal 3. Between the two supply voltage terminals 2, 3, there is connected a Zener diode 5a and a resistor 5b in series. The junction of these elements is connected to the base of transistor 5c.

The transistor 5c together with the resistor 5b and the Zener diode 5a acts as series controller 5 for limiting the charging voltage of the buffer capacitor 4. As long as the voltage across the capacitor has not reached the Zener breakdown voltage of the Zener diode 5a less $U_{BE}$ (the base-emitter voltage of transistor 5c), transistor 5c receives a negative base-emitter voltage and hence conducts. If, however, the voltage at the buffer capacitor 4 reaches the Zener voltage $U_Z$ of the Zener diode 5a, the base-emitter voltage tends toward zero volts and transistor 5c turns off.

Thus, the buffer capacitor 4 is charged via the series controller 5 to a voltage $U_C = U_Z - U_{BE}$ which is set by characteristics of the Zener diode 5a so as to be above the operating voltage of the electronic device 1.

The voltage at the buffer capacitor 4 is then reduced by the voltage stabilizing circuit 6 to a value suitable for the electronic device 1. The voltage stabilizing circuit 6 per se is known as a stabilizing circuit for battery voltages from the ITT book "Circuit examples with discrete semiconductor components", edition 76/1, pages 46/47.

The voltage at the electronic device 1 is controlled via the transistor 6a, whose collector-emitter path is inserted between a terminal of capacitor 4 and a terminal 1b of the electronic device 1. The second terminal of the buffer capacitor 4 is connected directly to a terminal 1a of the buffer capacitor 4. The base of transistor 6a receives a base current applied via the transistor 6b, whose emitter is connected to the supply voltage terminal 2 and whose collector is connected to the base of transistor 6a. Transistor 6b in turn receives a base current via a resistor 6c arranged between the base of transistor 6b and the collector of transistor 6a.

Between the two terminals 1a and 1b a voltage divider with the resistors 6e and 6f is arranged, the junction of which is connected to the base of a transistor 6d. The emitter of transistor 6d is connected to the supply voltage terminal 2, while the collector is connected to the junction of resistor 6c and the base of transistor 6e.

When the supply voltage at the terminals 1a, 1b rises, transistor 6d becomes increasingly conducting. Thereby a major portion of the current flowing across resistor 6c is conducted away via transistor 6d and hence from the base of transistor 6b. As a result, the series transistor 6a receives less base current and hence increases its resistance. Thereby the rise in supply voltage at the terminals 1a, 1b is compensated.

The supply voltage present at the terminals 1a, 1b is essentially fixed by the voltage divider ratio of the resistors 6e, 6f and by the base-emitter voltage of transistor 6d.

The capacitor 6g lying parallel to the terminals 1a, 1b serves to smooth the supply voltage.

With this circuit the supply voltage at the terminals 1a, 1b of the electronic device 1 remains largely constant even when the voltage at the buffer capacitor 4 drops due to discharge thereof. This is true essentially as long as the voltage at the buffer capacitor 4 is above the operating voltage of the electronic device by the collector-emitter voltage of the saturation series transistor 6a. With this circuit, the buffer capacitor 4 can be charged to a voltage above the operating voltage of the electronic device 1 and thus stores a relatively high energy for bridging a power failure. The time until the buffer capacitor 4 is discharged to the minimum operating voltage of the electronic device 1 can therefore be increased as compared to conventional circuits using a capacitor similar to the buffer capacitor 4 but without the circuitry disclosed herein.

What is claimed is:

1. A power supply unit for temporarily supplying power to an electronic device having an operating voltage when an outside voltage supply is interrupted, the circuit comprising:
   (a) first and second input terminals for connection to said outside voltage supply;
   (b) first and second output terminals for supplying power to the electronic device;
   (c) a stand-by capacitor coupled to said first and second input terminals, said stand-by capacitor being constantly loaded to a load voltage higher than the operating voltage of the electronic device;
   (d) a voltage stabilizing circuit coupled between the stand-by capacitor and the output terminals for reducing said load voltage to the operating voltage during the interruption of the outside voltage supply, said stabilizing circuit further maintaining the reduced load voltage at said operating voltage while the load voltage is greater than or equal to said operating voltage.

2. A power supply unit according to claim 1, wherein a series controller is coupled between the input terminals and the stand-by capacitor for controlling the load voltage on the stand-by capacitor from said outside voltage source.

3. The power supply unit according to claim 2, wherein said voltage stabilizing circuit contains a series transistor, whose emitter-collector path is arranged between the stand-by capacitor and one of said output terminal; wherein said series transistor is supplied with base current from a first transistor; wherein said first transistor in turn is supplied with base current through a resistor; wherein a second transistor is provided whose base is connected via a voltage divider to the output terminals and wherein, with increasing voltage to the output terminals said second transistor draws current of the resistor away from the base of the first transistor.

4. A method for operating a power supply circuit to temporarily supply power to an electronic device having an operating voltage during the interruption of an outside voltage supply, the method comprising the steps of:
   (a) constantly loading, with the outside voltage supply, a stand-by capacitor to a higher load voltage than the operating voltage of said electronic device;
   (b) reducing said load voltage to the operating voltage through a voltage stabilizing circuit during the interruption of the outside voltage supply;
   (c) coupling the reduced load voltage to said electronic device; and
   (d) maintaining said reduced load voltage at said operating voltage while said load voltage is greater than or equal to said operating voltage.

* * * * *